(12) United States Patent
Naslund et al.

(10) Patent No.: US 10,852,316 B2
(45) Date of Patent: Dec. 1, 2020

(54) ADVANCED AIR DATA SYSTEM ARCHITECTURE WITH AIR DATA COMPUTER INCORPORATING ENHANCED COMPENSATION FUNCTIONALITY

(71) Applicant: Rosemount Aerospace Inc., Burnsville, MN (US)

(72) Inventors: Brian Brent Naslund, Chanhassen, MN (US); Joel Boelke, Eden Prairie, MN (US); Benjamin John Langemo, Shakopee, MN (US); Kevin Benning, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 252 days.

(21) Appl. No.: 16/009,846

(22) Filed: Jun. 15, 2018

(65) Prior Publication Data
US 2019/0383847 A1    Dec. 19, 2019

(51) Int. Cl.
*G01P 5/14*    (2006.01)
*B64D 43/02*    (2006.01)
(Continued)

(52) U.S. Cl.
CPC .............. *G01P 5/14* (2013.01); *B64D 43/02* (2013.01); *G01P 5/16* (2013.01); *G01P 5/17* (2013.01)

(58) Field of Classification Search
CPC ...... G01P 5/14; G01P 5/17; G01P 5/16; G01P 13/025; G01P 5/165; B64D 43/02
See application file for complete search history.

(56) References Cited

U.S. PATENT DOCUMENTS

| | | |
|---|---|---|
| 4,112,756 A | 9/1978 | MacLennan et al. |
| 4,143,548 A | 3/1979 | Graewe et al. |

(Continued)

FOREIGN PATENT DOCUMENTS

| | | |
|---|---|---|
| DE | 102014105366 A1 | 10/2015 |
| EP | 1256811 A2 | 11/2002 |

(Continued)

OTHER PUBLICATIONS

Extended European Search Report for European Patent Application No. 17206457.8, dated Feb. 22, 2018, 8 pages.

(Continued)

*Primary Examiner* — Eric S. McCall
*Assistant Examiner* — Timothy P Graves
(74) *Attorney, Agent, or Firm* — Kinney & Lange, P.A.

(57) ABSTRACT

A system includes an air data computer (ADC) having a single pneumatic port for receiving a pneumatic input, a plurality of electrical inputs for receiving one or more electrical signals, and an output. The ADC can transmit, via the output, air data parameters based on the received pneumatic input and the received one or more electrical signals. In a further example embodiment, the system includes a first pressure sensing probe discrete from the ADC and a pneumatic connection joining a pressure sensing port of the first probe to the pneumatic input of the ADC. Second and third pressure sensing probes pneumatically coupled to respective pressure modules, which output electrical signals to the ADC, the electrical signals being representative of pressures sensed by the second and third pressure sensing probes, respectively.

16 Claims, 3 Drawing Sheets

(51) Int. Cl.
*G01P 5/17* (2006.01)
*G01P 5/16* (2006.01)

(56) References Cited

U.S. PATENT DOCUMENTS

| | | | |
|---|---|---|---|
| 4,303,978 A * | 12/1981 | Shaw | G01C 21/16 |
| | | | 244/177 |
| 5,423,209 A | 6/1995 | Nakaya et al. | |
| 5,585,557 A | 12/1996 | Loschke et al. | |
| 6,012,331 A | 1/2000 | Menzies et al. | |
| 6,336,060 B1 | 1/2002 | Shigemi et al. | |
| 6,452,542 B1 | 9/2002 | Bachinski et al. | |
| 6,561,020 B2 | 5/2003 | Glenney | |
| 6,604,029 B2 | 8/2003 | Cronin et al. | |
| 6,609,421 B2 | 8/2003 | Cronin et al. | |
| 6,626,024 B1 | 9/2003 | Hedrick | |
| 6,668,640 B1 | 12/2003 | Alwin et al. | |
| 7,051,586 B2 | 5/2006 | Choisnet et al. | |
| 7,155,969 B2 | 1/2007 | Drutowski et al. | |
| 7,379,839 B2 | 5/2008 | Cronin et al. | |
| 8,095,251 B2 | 1/2012 | Preaux | |
| 8,261,609 B2 | 9/2012 | Choisnet et al. | |
| 8,365,591 B2 | 2/2013 | Golly | |
| 8,527,233 B2 | 9/2013 | McIntyre | |
| 8,620,495 B2 | 12/2013 | Alwin et al. | |
| 9,121,860 B1 | 9/2015 | Cronyn | |
| 9,612,252 B2 | 4/2017 | Waddington | |
| 9,834,316 B2 | 12/2017 | Rolinski et al. | |
| 2002/0169525 A1 | 11/2002 | Cronin et al. | |
| 2004/0122615 A1 * | 6/2004 | Cronin | G01P 13/025 |
| | | | 702/138 |
| 2007/0107510 A1 | 5/2007 | Agami et al. | |
| 2007/0182590 A1 | 8/2007 | Younkin | |
| 2007/0220967 A1 | 9/2007 | Thomas et al. | |
| 2009/0055036 A1 | 2/2009 | Vozhdaev et al. | |
| 2009/0222150 A1 | 9/2009 | Preaux | |
| 2011/0141471 A1 | 6/2011 | Schlotterbeck et al. | |
| 2012/0123704 A1 * | 5/2012 | Golly | G01P 13/025 |
| | | | 702/50 |
| 2012/0298801 A1 | 11/2012 | Ellison | |
| 2014/0180503 A1 * | 6/2014 | Colliau | G01P 5/14 |
| | | | 701/3 |
| 2015/0006020 A1 | 1/2015 | D'Arbonneau | |
| 2015/0012155 A1 | 1/2015 | Mandle | |
| 2015/0032300 A1 | 1/2015 | Arethens et al. | |
| 2015/0233962 A1 | 8/2015 | Tchoryk et al. | |
| 2015/0276787 A1 | 10/2015 | Kimmel et al. | |
| 2016/0180611 A1 | 6/2016 | Cadotte et al. | |
| 2016/0305802 A1 | 10/2016 | Chong et al. | |
| 2017/0158347 A1 | 6/2017 | Anderson et al. | |

FOREIGN PATENT DOCUMENTS

| | | | |
|---|---|---|---|
| EP | 1256812 A2 | 11/2002 | |
| EP | 1256863 A2 | 11/2002 | |
| EP | 1391736 A1 | 2/2004 | |
| EP | 1936386 A2 | 6/2008 | |
| EP | 2434296 A2 | 3/2012 | |
| EP | 2453245 A1 | 5/2012 | |
| EP | 2923949 A1 | 9/2015 | |
| EP | 3081945 A1 | 10/2016 | |
| IN | 201301950 | 6/2016 | |
| WO | WO02088632 A2 | 11/2002 | |
| WO | WO2006046271 A2 | 5/2006 | |
| WO | WO2015179905 A1 | 12/2015 | |

OTHER PUBLICATIONS

Extended European Search Report for European Patent Application No. 17207656.4, dated Mar. 2, 2018, 8 pages.
"Deutsche Airbus Flight Test of Rosemount Smart Probe for Districuted Air Data Systems" Floyd W. Hagen and Dr. Harald Seidel, pp. 110-117.
Extended European Search Report for EP Application No. 19175352.4, dated Nov. 12, 2019, pp. 8.
Extended European Search Report for EP Application No. 19179986.5, dated Nov. 12, 2019, pp. 9.
Extended European Search Report for EP Application No. 19180014.3, dated Nov. 22, 2019, pp. 9.
Ardupilot, "Using an Airspeed Sensor, "https://ardupilot.org/plane/docs/airspeed.html, {Jan 16, 2018 Archive copy: https://webarchive.org/web/20180116072550/https://ardupilot.org./plane/docs/airspeed.html] (Year:2018).

* cited by examiner

ADVANCED AIR DATA SYSTEM ARCHITECTURE WITH AIR DATA COMPUTER INCORPORATING ENHANCED COMPENSATION FUNCTIONALITY

BACKGROUND

The present disclosure relates generally to air data systems and, more particularly, to air data systems utilizing multiple input air data computers to advance technical performance over traditional air data systems and mitigate cost and complexity of fully integrated air data systems.

Modern aircraft often incorporate air data systems that calculate air data outputs based on measured parameters collected from various sensors positioned about the aircraft. For instance, many air data systems utilize air data probes that measure pneumatic pressure of oncoming airflow about the aircraft exterior to generate aircraft air data outputs, such as angle of attack (i.e., an angle between the oncoming airflow or relative wind and a reference line of the aircraft, such as a chord of a wing of the aircraft), calibrated airspeed, Mach number, altitude, or other air data parameters. During sideslip of the aircraft (i.e., a nonzero angle between the direction of travel of the aircraft and the aircraft centerline extending through the nose of the aircraft), compensation of various local (to the probe) parameters or signals, such as angle of attack and static pressure, is advantageous for accurate determination of aircraft air data parameters, such as aircraft angle of attack or aircraft pressure altitude (determined from static pressure measurements).

Increased accuracy achieved through sideslip compensation is particularly relevant in modern aircraft employing advanced control mechanisms that operate in the National Airspace System, as well as to accommodate fly-by-wire or other control systems that may benefit from increased accuracy achieved through sideslip compensation. To this end, many air data systems utilize multiple pneumatic air data probes positioned at opposite sides of the aircraft and cross-coupled to exchange pressure information. Static pressure sensed by an opposite side probe is used to compensate air data parameter outputs for a sideslip condition. In certain air data systems, cross-coupled probes are pneumatically connected so that the pressure signals are averaged between probes. Other air data systems utilize air data probes that are not pneumatically connected, but rather include processors and other electronic components for interchanging electrical signals representative of the pressure information (and other information) between probes. Such probes, having integrated electronics, are often referred to as electronic multi-function probes (MFPs). MFPs reduce the need for pneumatic couplings between the probes, thereby reducing space, cost, and maintenance associated with the pneumatic couplings. While MFPs reduce the overall cost of the air data system, the integrated electronics components increase the replacement cost and complexity of an individual probe. Accordingly, a need exists for an air data system that reduces the cost and complexity of individual probes while obtaining some or all of the cost-reducing and complexity reducing system benefits of using MFPs.

SUMMARY

In one example embodiment, a system includes an air data computer (ADC) having a single pneumatic port for receiving a pneumatic input, a plurality of electrical inputs for receiving one or more electrical signals, and an output. The ADC can transmit, via the output, air data parameters based on the received pneumatic input and the received one or more electrical signals.

In a further example embodiment, the system includes a first pressure sensing probe discrete from the ADC and a pneumatic connection joining a pressure sensing port of the first probe to the pneumatic input of the ADC. Second and third pressure sensing probes are pneumatically coupled to respective pressure modules, which output electrical signals to the ADC, the electrical signals being representative of pressures sensed by the second and third probes, respectively.

In another example embodiment, a system includes first, second, and third air data systems, each air data system including an ADC receiving a single pneumatic input from a pitot pressure probe and receiving electric signals representative of static pressures measured at first and second static pressure probes. The ADC is configured to output air data parameters based on the single pneumatic input from the pitot pressure probe and one or more electric signals received by the ADC from the first and second static pressure probes.

DETAILED DESCRIPTION

As described herein, an example air data system architecture includes an air data computer (ADC) that is co-located with at least one pressure sensing probe. The ADC includes a single pneumatic connection communicating with a port of the pressure sensing probe, e.g., a total pressure port or static pressure port, and a plurality of other connections electrically coupling the ADC to one or more other air data probes, e.g., pitot pressure probes, static pressure probe, total air temperature (TAT) sensors, angle of sideslip (AOS) sensors, and angle of attack (AOA) sensors. Accordingly, this example air data system architecture eliminates pneumatic connections between the ADC and all but one air data probe, thereby reducing cost, maintenance, and complexity of the air data system. Furthermore, the single pneumatic connection permits the ADC to be co-located with one of the pressure sensing probes without resorting to multi-function probes (MFP) having integrated electronics and, thus, reduces the air data probe replacement cost while maintaining the overall cost reducing benefits of utilizing MFPs in the air data system.

Figure 1:
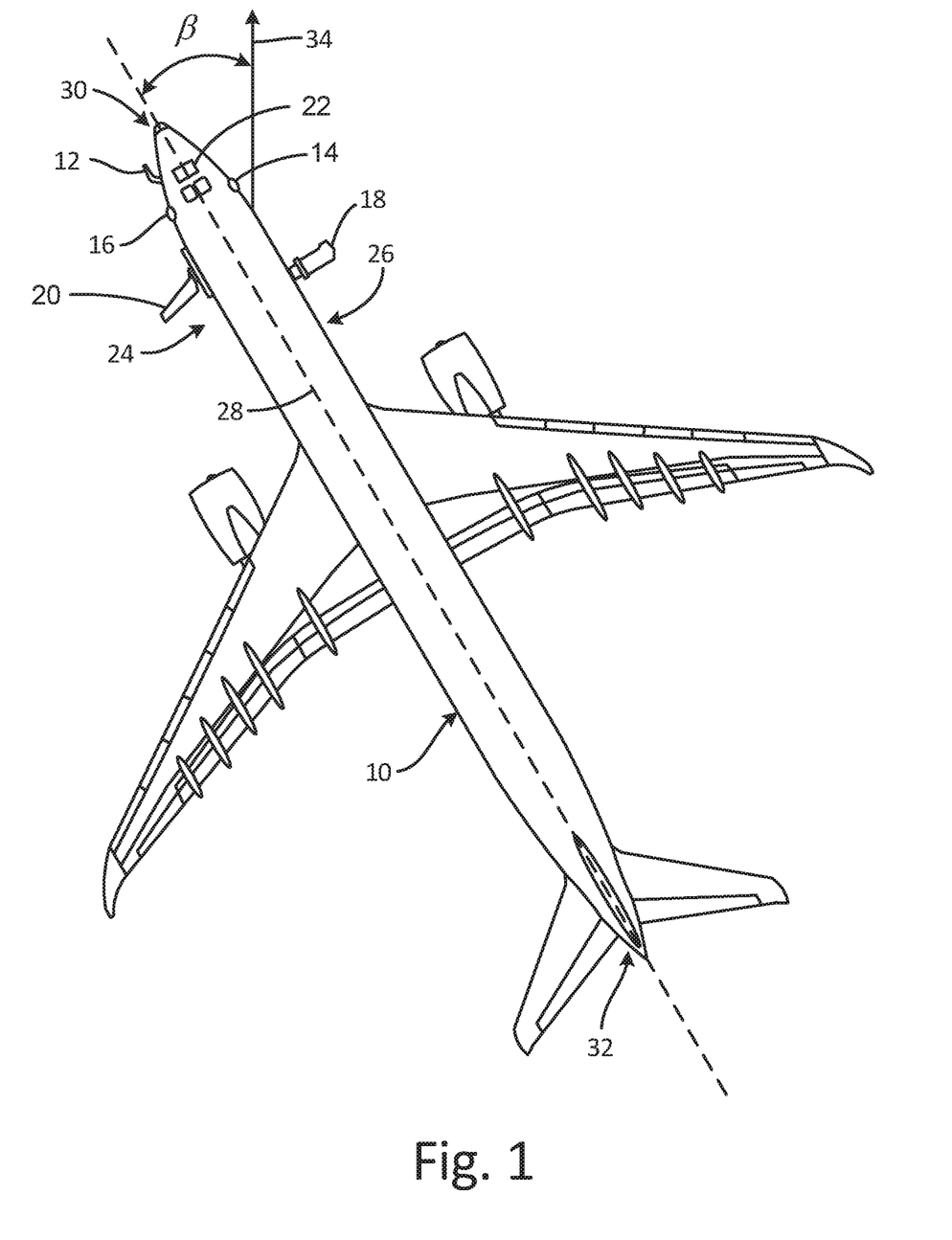
FIG. 1 is a top plane view and schematic representation of an aircraft in a sideslip condition having various air data probes attached to an exterior of the aircraft.

FIG. 1 is a top plane view and schematic representation of aircraft 10 that includes pitot pressure probe 12, static pressure probes 14 and 16, total air temperature (TAT) sensor 18, angle of attack (AOA) sensor 20, and air data computer (ADC) 22. Aircraft 10 includes first side 24 (or left side) and second side 26 (or right side) that is opposite first side 24 and separated by central plane 28 that extends from nose 30 to tail 32 orthogonal to a plane extending through the wings of aircraft 10. As illustrated, aircraft 10 is in a sideslip condition where the path of travel of aircraft 10 is indicated at 34, and angle β between travel path 34 and central plane 28 is the angle of sideslip of aircraft 10. Additionally, while the following embodiments are discussed with reference to aircraft 10 or fixed wing aircraft, aspects of the following disclosure are equally applicable to other types of vehicles such as flying wing (i.e., tailless) aircraft, rotary-wing aircraft, among others.

Pitot pressure probe 12 and static pressure probes 14 and 16 are air data probes attached to an exterior of aircraft 10. Pitot pressure probe 12 is any probe having a pressure-sensing port orientated such that the oncoming airflow received through the port stagnates at a pressure sensor, thereby measuring pitot pressure (or total pressure). In the illustrated embodiment, pitot pressure probe 12 includes a barrel portion that extends forward into the oncoming airflow relative to aircraft 10. A pitot pressure (or total pressure) sensing port is positioned in a leading nose of the pitot pressure probe barrel.

Static pressure probes 14 and 16 each include static pressure sensing ports oriented generally parallel to the oncoming airflow. As shown in FIG. 1, static pressure probes 14 and 16 are flush-mounted probes and, as such, have static pressure sensing ports that are aligned with the exterior surface of aircraft 10. However, other types of static pressure probes could be implemented. For example, one or both of static pressure probes 14 and 16 can have static pressure ports in barrel portions of pitot-style probes.

In an air data architecture according to the present disclosure, one of probes 12, 14, and 16 can be pneumatically coupled to ADC 22 directly. The remaining probes are pneumatically coupled to a pressure module that functions to convert pressure sensed by one or more of probes 12, 14, and 16 to a pressure signal representative of the sensed pressure of the pneumatically-coupled probe. Alternatively, one or more of the remaining probes can have processors and other electronics integrated into the probe housing or an attached transducer, in a manner similar to a MFP, to produce the pressure signal in place of the pressure module. In either case, the pressure signal can be an analog signal (e.g., a voltage representative of the sensed pressure) or a digital signal. The pressure modules transmit one or more pressure signals to ADC 22, depending on the number of pressure sensing probes.

TAT sensor 18 is a total air temperature sensing probe configured to extend into and measure the stagnation (or total) temperature of the airflow. TAT sensor 18 includes one or more temperature sensing elements and conditioning circuitry for sensing total air temperature of airflow about the exterior of aircraft 10 and provides total air temperature data, via an analog or digital signal, for use in generating aircraft air data parameter outputs, such as aircraft true airspeed (TAS) and static air temperature (SAT).

AOA sensor 20 is an angle of attack sensing probe configured to extend into the airflow to measure the angle of attack of aircraft 10. To measure the angle of attack of aircraft 10 relative to the oncoming airflow, AOA sensor 20 includes a vane that extends outward from the exterior of aircraft 10. The oncoming airflow acts on the AOA vane, this interaction causing a chord-wise dimension of the AOA vane to align with a direction of oncoming airflow. Rotary encoders within a base of AOA sensor 20 measure the rotation of the AOA vane relative to the base to produce an angle of the aircraft relative to the oncoming airflow. Because AOA sensor 20 is mounted to a side surface of aircraft 10, AOA sensor 20 produces angle of attack data.

Although not illustrated in FIG. 1, some embodiments may include an angle of sideslip sensor. Like AOA sensor 20, angle of sideslip (AOS) sensors have vanes extending into the airflow to measure an angle of the aircraft relative to the airflow. However, because AOS sensors are attached to the top or bottom side of the aircraft, AOS sensors produce angle of sideslip data in lieu of angle of attack data.

TAT sensor 18, AOA sensor 20, and an AOS sensor, if included, are electrically coupled with ADC 22 to provide data for determining various air data parameter outputs. ADC 22 determines a set of air data parameters outputs (e.g., aircraft angle of attack, aircraft angle of sideslip, aircraft calculated airspeed, aircraft Mach number, aircraft pressure altitude, or other aircraft air data parameters outputs) based on received electrical and pneumatic signals which may include some or all of the total air temperature data, the angle of attack data, and the angle of sideslip data as well as the received pneumatic signal and the one or more other pressure signals from pressure sensing probes.

Figure 2:
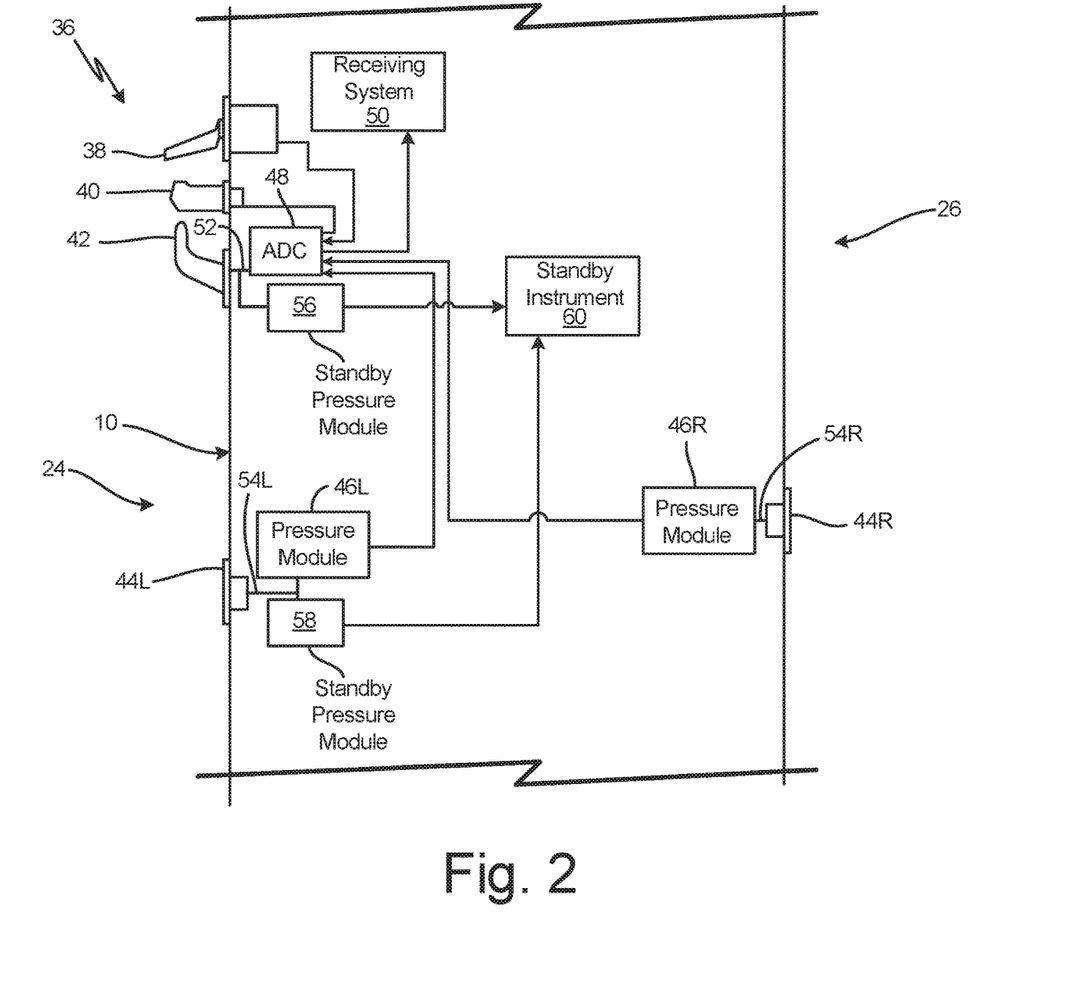
FIG. 2 is a schematic block diagram of an air data system architecture incorporating an air data computer (ADC) with a single pneumatic input, multiple electrical inputs, and an output.

FIG. 2 is a schematic block diagram of example air data system architecture 36 that includes AOA sensor 38, TAT sensor 40, pitot pressure probe 42, static pressure probes 44L and 44R, pressure modules 46R and 46L, air data computer 48, and receiving system 50. AOA sensor 38, TAT sensor 40, pitot pressure probe 42, and static pressure probes 44L and 44R are air data components that are configured and operate in the same way as corresponding components described with respect to FIG. 1. Although each of the air data components are shown attached to first side 24 (or left side) or to second side 26 (or right side) of aircraft 10, the following air data system can be configured to have respective components attached to the opposite side of aircraft 10 consistent with the description of air data system architecture 36.

Air data computer (ADC) 48 includes a single pneumatic port for receiving a pneumatic input and multiple electrical inputs, the electrical inputs being configured to receive electrical signals such as analogue signals (e.g., a voltage signal indicative of a measured value), digital signals, or a combination of analogue and digital signals. Internal to ADC 48, processors work in conjunction with memory and other electronic devices to produce air data parameter outputs based on the received pneumatic, analogue, and/or digital signals. The air data parameters are transmitted to receiving system 50 by ADC 48. Receiving system 50 utilizes air data parameters produced by ADC 48 for various aircraft operations, e.g., displaying the air data parameters on one or more flight displays and/or used to determine stall warnings, etc.

ADC 48 is co-located with one of the pressure sensing probes 42, 44L, and 44R. In the example air data architecture 36, ADC 48 is co-located with (or located in close proximity to) discrete pitot pressure probe 42, which includes a total pressure port pneumatically-coupled to the pneumatic port of ADC 48 via pneumatic connection 52. In other words, ADC 48 is adjacent to a pitot pressure probe 42 without being integrated into a housing of probe 42, such as a multi-function probe (MFP) having integrated electronics. Additionally, because ADC 48 has a single pneumatic port paired with multiple electrical inputs, the need for additional pneumatic connections (e.g., pneumatic connections used for cross-coupling pressure probes) is eliminated and a length of the remaining pneumatic connection (e.g., connection 52) is minimized to eliminate lengthy pneumatic connections. In this instance, ADC 48 has only one pneumatic port. For example, ADC 48 can be located on the same side of aircraft 10 as probe 42. Furthermore, air data computers are not co-located with a pneumatically-connected probe if the air data computer and the probe are separated by a relative large axial length of the aircraft (e.g., a probe located on the nose of aircraft 10 and an ADC located aft of the nose proximate to the wings or tail of aircraft 10).

Static pressure sensing probes 44L and 44R can be any type of static pressure probes that are pneumatically coupled to pressure modules 46L and 46R via pneumatic connections 54L and 54R, respectively. As shown in FIG. 2, static pressure sensing probes 44L and 44R are flush-mounted probes. Module 46L and module 46R are each co-located with their respective probes 44L and 44R to minimize the lengths of connections 54L and 54R similarly to pneumatic connection 52. Pressure modules 46L and 46R each communicate with a pressure sensing port of respective static pressure sensing probes 44L and 44R to receive a pneumatic signal representative of a static pressure of the oncoming airflow external to aircraft 10, converting the pneumatic signal to a digital or analogue output representative of the sensed static pressure of each probe. Modules 46L and 46R are electrically coupled to ADC 48 via one of the electrical inputs in order to transmit static pressure signals (i.e., analogue and/or digital signals) to ADC 48.

Alternatively, static pressure probes and associated pressure modules may be replaced with static pressure probes with integrated electronics. In these embodiments, the static pressure probe includes processors and other electronics integrated within the probe housing or in an attached transducer that produce one or more electric signals (i.e., analogue and/or digital signals) indicative of sensed static pressure of the oncoming airflow, which are transmitted to an electric input of ADC 48.

AOA sensor 38 is electrically coupled to ADC 48 via one of the electrical inputs to provide electrical signals representative of angle of attack data to ADC 48. Similarly, TAT sensor 40 is electrically coupled with ADC 48 via one of the electrical inputs to provide total air temperature data corresponding to measured total air temperature of the oncoming airflow to ADC 48. While the example of FIG. 2 is described with respect to an air data system architecture including TAT sensor 40, air data system architectures implementing techniques described herein need not include TAT sensor 40 in all examples. For instance, in some examples, such as when ADC 48 does not produce air data parameter outputs that are dependent upon total air temperature (e.g., true airspeed, static air temperature, or other air data parameter outputs), the air data system architecture need not include TAT sensor 40.

In operation, as air flows over the exterior of aircraft 10, ADC 48 produces local air data parameters (i.e., corresponding to the local conditions sensed at probes 42, 44L, 44R as well as AOA sensor 38 and TAT sensor 40) based on the measured pressures from pitot pressure probe 42, static pressure probes 44L and 44R, angle of attack data received from AOA sensor 38, and total air temperature data received from TAT sensor 40. In a sideslip condition, left-side static pressure probe 44L experiences different flow conditions than those experienced by right-side static pressure probe 44R. For instance, in the sideslip condition having sideslip angle β illustrated in FIG. 1, right-side static pressure probe 44R experiences airflow having higher pressure conditions than those experienced by left-side static pressure probe 44L due to the acceleration of the airflow about the aircraft exterior prior to reaching left-side static pressure probe 44L. Accordingly, ADC 48 is electrically connected to pressure module 46R to receive static pressure data corresponding to static pressure of the oncoming airflow sensed by right-side static pressure probe 44R and left-side static pressure probe 44L. ADC 48 determines an angle of sideslip of aircraft 10 as a function of the difference between static pressure data received from right-side and left-side static pressure probes 44R and 44L. Using the differential static pressure data, ADC 48 compensates (e.g., modifies) the determined air data parameters based on the determined angle of sideslip, thereby providing air data parameter outputs that are compensated for aircraft angle of sideslip conditions.

Although air data system architecture 36 depicts ADC 48 co-located with pitot pressure probe 42, ADC 48 can be co-located with either static pressure sensor 44L or 44R. In these embodiments, pressure module 46L (or pressure module 46R) is replaced with ADC 48, which is directly connected to one of static pressure probes 44L and 44R via its single pneumatic port. Additionally, in these embodiments, pitot pressure probe 42 communicates with a pressure module that transmits an analogue or digital signal to ADC 48 in a manner similar static pressure probes 44R and 44L described in air data architecture 36. Furthermore, any pressure sensing probe communicating with a discrete pressure module may be replaced with a pressure sensing probe having integrated electronics. For example, pitot pressure probe 42 may produce one or more electric signals indicative of sensed pitot pressure of the oncoming airflow using processors and other electronics housed within probe 42 instead of communicating with a pressure module.

Air data system architecture 36 can also include one or more standby pressure modules to provide additional pressure data to a standby instrument, which is particularly useful when one or more components of air data system architecture 36 is not functioning. For instance, standby pressure module 56 can be pneumatically coupled to pitot pressure probe 42, and standby pressure module 58 can be pneumatically coupled to static pressure probe 44L (or static pressure probe 44R). Like pressure modules 46L and 46R, each of standby pressure modules 56 and 58 communicate with a pressure sensing port of a probe and produce an analogue or digital signal representative of a sensed pressure of the oncoming airflow. As shown in FIG. 2, standby pressure module 56 communicates with total pressure port of pitot pressure probe 42, and standby pressure module 58 communicates with a static pressure port of static pressure probe 58 to produce signals representative of sensed pitot pressure and sensed static pressure, respectively. Each of standby pressure modules 56 and 58 transmits pressure signals (i.e., analogue and/or digital signals) to standby instrument 60, which may be located on the flight deck of aircraft 10 to display one or more air data parameters independently of ADC 48. In this instance, outputs transmitted by ADC 48 to receiving system 50 perform primary functions of air data system architecture 36 while communications to standby instrument 60 perform auxiliary (or backup) functions of air data system architecture 36.

Although FIG. 2 shows standby pressure modules 56 and 58 sharing pneumatic connections 52 and 54L with ADC 48 and pressure module 46L, standby pressure modules 56 and 58 may be pneumatically connected to one or more standby instruments (not shown in FIG. 2) that are discrete and independent of pressure sensing probes 42, 44L, and 44R. Advantageously, the use of standby instruments instead of shared pneumatic connections increases the independence of standby air data parameters and protects against failures to pressure sensing probes 42, 44L, and 44R, which may affect both primary and standby systems.

Figure 3:
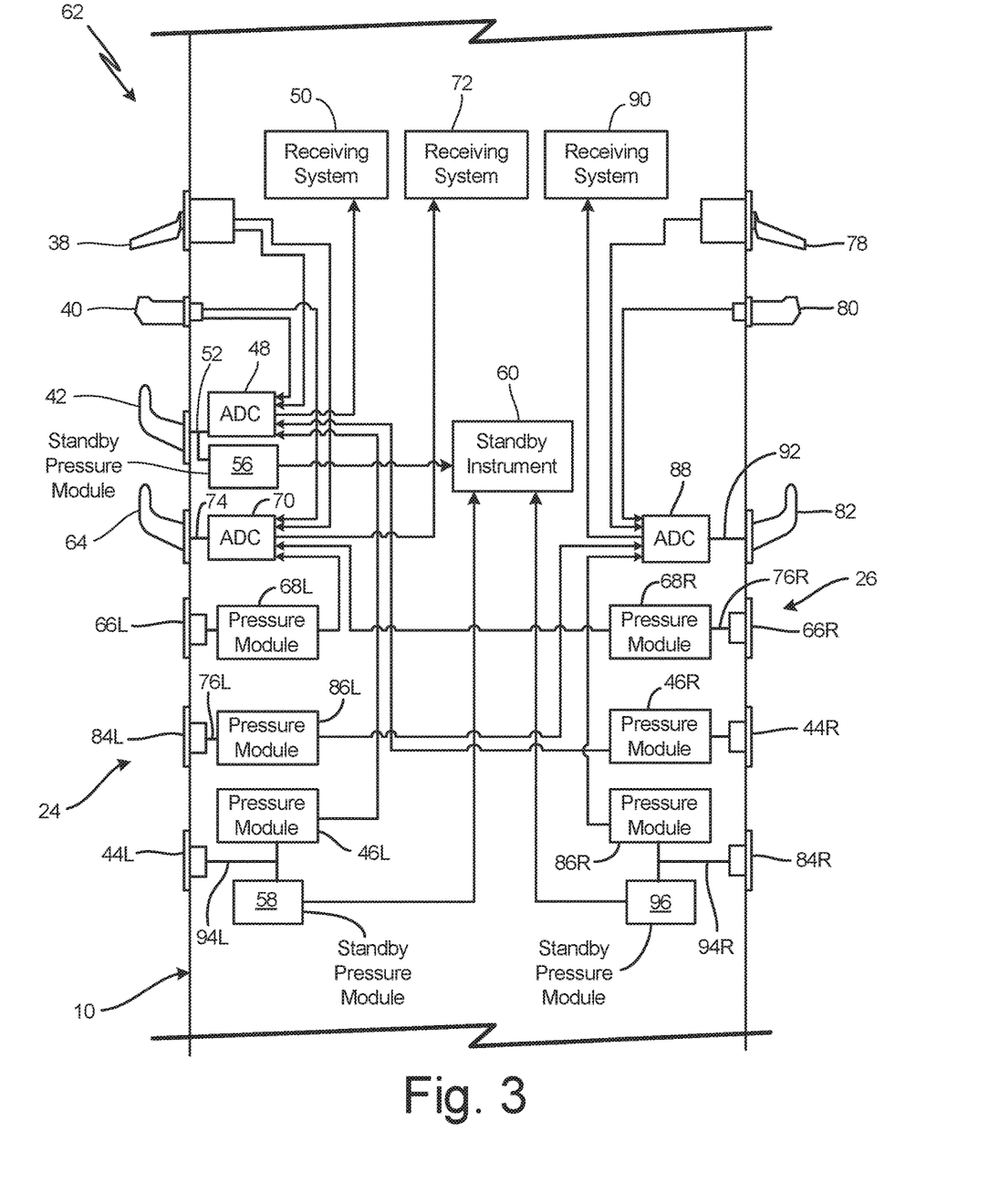
FIG. 3 is a schematic block diagram of an air data system architecture having three independent air data systems, each incorporating an ADC with a single pneumatic input, multiple electrical inputs, and an output.

FIG. 3 is a schematic block diagram of another example air data system architecture 62 that incorporates three discrete and independent air data systems. The first air data system is formed by air data system architecture 32 (see FIG. 2) and includes AOA sensor 38, TAT sensor 40, pitot pressure probe 42, static pressure probes 44L and 44R, pressure modules 46R and 46L, air data computer 48, receiving system 50, and standby pressure modules 56 and 58. The components of air data system architecture 32 are configured and operate in the same manner discussed with reference to FIG. 2. Additionally, air data system architecture 62 includes a second air data system and a third air data system, each air data system having a configuration that is similar (although not necessarily identical) to air data system architecture 32.

The second air data system includes pitot pressure probe 64, static pressure probes 66L and 66R, pressure modules 68L and 68R, ADC 70, and receiving system 72. The second air data system additionally includes AOA sensor 38 and TAT sensor 40, which is shared with the first air data system in the depicted example, although independent AOA and TAT sensors could be used in lieu of the depicted configuration. ADC 70 is similar to ADC 48 and includes a single pneumatic port, multiple electrical inputs, and an output. As shown, ADC 70 is co-located with pitot pressure probe 64, and the pneumatic port of ADC 70 is pneumatically coupled, via pneumatic connection 74, to a total pressure sensing port of probe 64. Alternatively, ADC 70 can be co-located with left-side static pressure probe 66L or right-side static pressure probe 66R as discussed in air data system architecture 32. Static pressure probes 66L and 66R are pneumatically coupled to pressure modules 68L and 68R via pneumatic connections 76L and 76R, respectively, and pressure modules 68L and 68R are electrically coupled to ADC 70 via one of the electrical inputs of ADC 70. In air data architecture 62, AOA sensor 38 and TAT sensor 40 are electrically coupled to both ADC 48 and ADC 70. Although not shown in FIG. 3, in some embodiments, the second air data system can include one or more standby pressure modules as disclosed in air data system architecture 32.

The third air data system includes AOA sensor 78, AOA sensor 80, pitot pressure probe 82, static pressure probes 84L and 84R, pressure modules 86L and 86R, ADC 88, and receiving system 90. ADC 88 includes a single pneumatic port, multiple electrical inputs, and an output and is similar to ADC 48 and ADC 70. As shown, ADC 88 is co-located with pitot pressure probe 82, and the pneumatic port of ADC 88 is pneumatically coupled to a total pressure port of probe 82 via pneumatic connection 92. Alternatively, ADC 88 can be co-located with left-side static pressure probe 84L or right-side static pressure probe 84R as discussed in air data system architecture 32. Static pressure probes 84L and 84R are pneumatically coupled to pressure modules 86L and 86R via pneumatic connections 94L and 94R, respectively, and pressure modules 94L and 94R are electrically coupled to one of the electrical inputs of ADC 88. In air data architecture 62, AOA sensor 78 and TAT sensor 80 are electrically coupled to ADC 88 to provide total air temperature data and angle of attack data to ADC 88 as described with reference to AOA sensor 38 and TAT sensor 40.

The third data system also includes standby pressure module 96 pneumatically coupled (e.g., via pneumatic connection 94R) to a static pressure port of right-side static pressure probe 84R as depicted in FIG. 3. Module 96 produces a digital or analogue signal representative of a sensed static pressure of the oncoming airflow and transmits this pressure signal to standby instrument 60. As with standby pressure modules 56 and 58, standby pressure module 96 may be coupled to any of the other pressure sensing probes in the first, second, and third air data systems. However, air data system architecture 62 benefits from a standby pressure module pneumatically coupled to a pitot pressure probe, a right-side static pressure probe, and a left-sides static pressure probe such that standby instrument 60 receives a sensed total pressure and static pressures sensed on the right-side and left-side of aircraft 10. For instance, air data system architecture includes standby pressure module 56 communicating with a total pressure port of pitot pressure probe 42 and standby pressure modules 58 and 96 communicating with static pressure ports of left-side static pressure probe 44L and right-side pressure probe 84R, respectively.

Receiving systems 50, 72, and 90 are depicted as discrete systems in architecture 62. As such, receiving systems 50, 72, and 90 are independent and, if designed and implemented using different components and circuitry can provide a degree of dissimilarity that guards against failure modes being common to all three systems. However, receiving systems 50, 72, and 90 may be implemented as a single receiving system, receiving air data parameter outputs from first, second, and third air data systems.

The following are non-exclusive descriptions of possible embodiments of the present invention.

A system according to an exemplary embodiment of this disclosure, among other possible things includes an air data computer (ADC) comprising a single pneumatic port for receiving a pneumatic input, a plurality of electrical inputs for receiving one or more electrical signals, and an output. The ADC is configured to transmit, via the output, air data parameters based on the received pneumatic input and the received one or more electrical signals.

The system of the preceding paragraph can optionally include, additionally and/or alternatively, any one or more of the following features, configurations and/or additional components:

A further embodiment of the foregoing system can further include a first pressure sensing probe discrete from the ADC comprising a first pressure sensing port for measuring a first pressure of an oncoming airflow about an exterior of the aircraft.

A further embodiment of any of the foregoing systems can further include a pneumatic connection joining a first pressure sensing port of a first pressure sensing probe to the pneumatic port of the ADC.

A further embodiment of any of the foregoing systems that include a first pressure sensing probe, wherein the first pressure sensing probe can be a pitot pressure probe, and the first pressure is a pitot pressure.

A further embodiment of any of the foregoing systems that include a first pressure sensing probe, wherein the first pressure sensing probe can be a static pressure probe, and the first pressure is a static pressure.

A further embodiment of any of the foregoing systems can further include a first input of the plurality of electrical inputs, a first static pressure probe configured to sense a first static pressure of the oncoming airflow about the aircraft exterior, and a first pressure module pneumatically connected to the first static pressure probe and electrically coupled to the first input of the ADC. The first pressure module is configured to transmit a first static pressure signal representative of the first static pressure to the ADC via the first input.

A further embodiment of any of the foregoing systems can further include a second input of the plurality of electrical inputs, a second static pressure probe configured to sense a second static pressure of the oncoming airflow about the aircraft exterior, and a second pressure module pneumatically connected to the second static pressure probe and electrically coupled to the second input of the ADC. The second pressure module is configured to transmit a second static pressure signal representative of the second static pressure to the ADC via the second input.

A further embodiment of any of the foregoing systems that include first and second static pressure probes, wherein the first static pressure probe can be disposed on a first side of the aircraft exterior, and the second static pressure probe can be disposed on a second side of the aircraft exterior that is opposite the first side of the aircraft exterior.

A further embodiment of any of the foregoing systems that include first and second static pressure probes, wherein each of the first static pressure probe and the second static pressure probe are flush-mounted static pressure probes configured to be aligned with an exterior of the aircraft.

A further embodiment of any of the foregoing systems can further include a receiving system of the aircraft electrically coupled to the output of the ADC to receive the air data parameters.

A further embodiment of any of the foregoing systems can further include a standby instrument and a standby pressure module.

A further embodiment of any of the foregoing systems with a standby instrument and a standby pressure module, wherein the standby pressure module can be pneumatically coupled to the first pressure sensing probe and configured to transmit a standby pressure signal representative of the first pressure of the oncoming airflow to the standby instrument.

A further embodiment of any of the foregoing systems with a standby instrument and a standby pressure module, wherein the standby pressure module can be pneumatically coupled to a standby pressure sensing probe and configured to transmit a standby pressure signal representative of the static pressure sensed by the standby pressure sensing probe to the standby instrument.

A further embodiment of any of the foregoing systems, wherein the ADC can be configured to determine an aircraft angle of sideslip based on the first and second static pressure signals received from the first and second static pressure probes, respectively, and to compensate the air data parameters based on the determined angle of sideslip.

A further embodiment of any of the foregoing systems can further include a second pressure sensing probe having a second pressure port configured to sense a second pressure of the oncoming airflow and a second pressure module pneumatically coupled to the second pressure port and configured to output a second pressure signal representative of the second pressure to the ADC via one of the electrical inputs.

A further embodiment of any of the foregoing systems can further include a third pressure sensing probe having a third pressure port configured to sense a third pressure of the oncoming airflow and a third pressure module pneumatically coupled to the third pressure port configured to output a third pressure signal representative of the third pressure to the ADC via one of the electrical inputs.

A further embodiment of any of the foregoing systems, wherein the air data parameters are compensated based on at least one of total air temperature data received from a total air temperature sensor electrically coupled to the ADC and angle of attack data of the aircraft received from an angle of attack sensor electrically coupled to the ADC.

A further embodiment of any of the foregoing systems, wherein at least one of the electrical signals received by the ADC is a digital signal representative of a pressure of the oncoming airflow sensed by a pressure sensing probe.

A system according to another exemplary embodiment of this disclosure, among other possible things includes a first air data system configured to provide first air data parameters, a second air data system configured to provide second air data parameters, and a third air data system configured to provide third air data parameters. Each of the air data systems includes an air data computer (ADC), a pitot pressure probe, a first static pressure probe, and a second static pressure probe. The ADC includes a single pneumatic port for receiving a pneumatic input, a plurality of electrical inputs for receiving one or more electrical signals, and an output. The pitot pressure probe is discrete from the ADC and is pneumatically coupled to the single pneumatic port of the ADC, being configured to sense pitot pressure of the oncoming airflow about an aircraft exterior. Each of the first and second static pressure probes are configured to be aligned with an exterior of the aircraft to sense static pressure of the oncoming airflow about the aircraft exterior. The first, second, and third air data systems are configured to transmit, via respective outputs of the ADCs, first, second, and third air data parameters, respectively, based on the pneumatic input and the one or more electrical signals received by respective ADCs.

The system of the preceding paragraph can optionally include, additionally and/or alternatively, any one or more of the following features, configurations and/or additional components:

A further embodiment of the foregoing system, wherein the ADCs of the first, second, and third air data systems can receive electrical inputs from at least one of an angle of attack sensor, an angle of sideslip sensor, and a total air temperature sensor.

A further embodiment of any of the foregoing systems, wherein the first, second, and third air data parameters can be compensated based on the electrical inputs received from at least one of an angle of attack sensor, an angle of sideslip sensor, and a total air temperature sensor.

A further embodiment of any of the foregoing systems, wherein two or more of the first air data system, the second air data system, and the third air data system can be independent from one another.

A further embodiment of any of the foregoing systems can further include a first receiving system receiving first air data parameters from the first air data system, a second receiving system receiving second air data parameters from the second air data system, and a third receiving system receiving third air data parameters from the third air data system.

A further embodiment of any of the foregoing systems can further comprise a standby instrument and first, second, and third standby pressure modules. The first standby pressure module can be pneumatically coupled to the pitot pressure probe of the first air data system and configured to transmit a first standby pressure signal representative of pitot pressure of the oncoming airflow sensed at the pitot pressure probe of the first air data system. The second standby pressure module can be pneumatically coupled to the first static pressure probe of the first air data system and configured to transmit a second standby pressure signal representative of static pressure of the oncoming airflow sensed by the first static pressure probe of the first air data system. The third standby pressure module can be pneumatically coupled to the second static pressure probe of the third air data system and configured to transmit a third standby pressure signal representative of static pressure of the oncoming airflow sensed by the second static pressure probe of the third air data system.

A further embodiment of any of the foregoing systems, wherein each of the first, second, and third air data systems can further include a first pressure module pneumatically coupled to the first static pressure probe and configured to output a first static pressure signal representative of the static pressure sensed by the first static pressure probe.

A further embodiment of any of the foregoing systems, wherein each of the first, second, and third air data systems can further include a second pressure module pneumatically coupled to the second static pressure probe and configured to output a second static pressure signal representative of the static pressure sensed by the second static pressure probe.

A further embodiment of any of the foregoing systems, wherein each ADC of the first, second, and third air data systems is co-located with respective pitot pressure sensing probes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   an air data computer (ADC) comprising a single pneumatic port for receiving a pneumatic input, a plurality of electrical inputs for receiving one or more electrical signals, and an output;
   a first pressure sensing probe discrete from and co-located with the ADC comprising a first pressure sensing port for measuring a first pressure of an oncoming airflow about an exterior of an aircraft;
   a pneumatic connection joining the first pressure sensing port to the pneumatic port of the ADC such that the pneumatic input is representative of the first pressure, wherein the ADC is configured to transmit, via the output, air data parameters based on the received pneumatic input and the received one or more electrical signals;
   a receiving system of the aircraft electrically coupled to the output of the ADC to receive the air data parameters;
   a standby instrument; and
   a standby pressure module pneumatically coupled to the first pressure sensing probe and configured to transmit a standby pressure signal representative of the first pressure of the oncoming airflow to the standby instrument.

2. The system of claim 1, wherein the first pressure sensing probe is a pitot pressure probe, and the first pressure is a pitot pressure.

3. The system of claim 1, wherein the first pressure sensing probe is a static pressure probe, and the first pressure is a static pressure.

4. The system of claim 2, and further comprising:
   a first input of the plurality electrical inputs;
   a first static pressure probe configured to sense a first static pressure of the oncoming airflow about the aircraft exterior; and
   a first pressure module pneumatically coupled to the first static pressure probe and electrically coupled to the first input, wherein the first pressure module is configured to transmit a first static pressure signal representative of the first static pressure to the ADC via the first input.

5. The system of claim 4, and further comprising:
   a second input of the plurality electrical inputs;
   a second static pressure probe configured to sense a second static pressure of the oncoming airflow about the aircraft exterior; and
   a second pressure module pneumatically connected to the second static pressure probe and electrically coupled to the second input, wherein the second pressure module is configured to transmit a second static pressure signal representative of the second static pressure to the ADC via the second input.

6. The system of claim 5, wherein the first static pressure probe is disposed on a first side of the aircraft exterior, and wherein the second static pressure probe is disposed on a second side of the aircraft exterior that is opposite the first side of the aircraft exterior.

7. The system of claim 6, wherein each of the first static pressure probe and the second static pressure probe are flush-mounted static pressure probes configured to be mounted parallel to the aircraft exterior.

8. The system of claim 6, wherein the ADC is configured to determine an aircraft angle of sideslip based on the first and second static pressure signals received from the first and second static pressure probes, respectively, and to compensate the air data parameters based on the determined aircraft angle of sideslip.

9. The system of claim 1, and further comprising:
   a second pressure sensing probe having a second pressure port configured to sense a second pressure of the oncoming airflow;
   a second pressure module pneumatically coupled to the second pressure port and configured to output a second pressure signal representative of the second pressure to the ADC via one of the electrical inputs;
   a third pressure sensing probe having a third pressure port configured to sense a third pressure of the oncoming airflow; and
   a third pressure module pneumatically coupled to the third pressure port configured to output a third pressure signal representative of the third pressure to the ADC via one of the electrical inputs.

10. The system of claim 5, wherein the air data parameters are compensated based on at least one of total air temperature data received from a total air temperature sensor electrically coupled to the ADC, angle of attack data of the aircraft received from an angle of attack sensor electrically coupled to the ADC, and angle of sideslip data of the aircraft received from an angle of sideslip sensor electrically coupled to the ADC.

11. The system of claim 1, wherein at least one of the electrical signals received by the ADC is a digital signal representative of a pressure of the oncoming airflow sensed by a pressure sensing probe.

12. A system comprising:
    a first air data system configured to provide first air data parameters;
    a second air data system configured to provide second air data parameters;

a third air data system configured to provide third air data parameters, wherein each of the first, second, and third air data systems comprise:
    an air data computer (ADC) comprising a single pneumatic port for receiving a pneumatic input, a plurality of electrical inputs for receiving one or more electrical signals, and an output;
    a pitot pressure probe discrete from the ADC configured to sense pitot pressure of the oncoming airflow about an aircraft exterior, wherein the pitot pressure probe is pneumatically coupled to the single pneumatic port of the ADC;
    a first static pressure probe configured to be aligned with the aircraft exterior to sense static pressure of the oncoming airflow about the aircraft exterior; and
    a second static pressure probe configured to be mounted parallel to the aircraft exterior to sense static pressure of the oncoming airflow about the aircraft exterior, wherein each ADC of the first, second, and third air data systems is configured transmit, via respective outputs, first, second, and third air data parameters, respectively, based on the pneumatic input and the one or more electrical signals received by respective ADCs;
a standby instrument;
a first standby pressure module pneumatically coupled to the pitot pressure probe of the first air data system and configured to transmit a first standby pressure signal representative of pitot pressure of the oncoming airflow about the aircraft exterior to the standby instrument;
a second standby pressure module pneumatically coupled to the first static pressure probe of the first air data system and configured to transmit a second standby pressure signal representative of static pressure of the oncoming airflow sensed by the first static pressure probe of the first air data system; and
a third standby pressure module pneumatically coupled to the second static pressure probe of the third air data system and configured to transmit a third standby pressure signal representative of static pressure of the oncoming airflow sensed by the second static pressure probe of the third air data system.

13. The system of claim 12, wherein the ADCs of the first, second, and third air data systems receive electrical inputs from at least one of an angle of attack sensor, an angle of sideslip sensor, and a total air temperature sensor, and the first, second, and third air data parameters are compensated based on the electrical inputs.

14. The system of claim 12, wherein two or more of the first air data system, the second air data system, and the third air data system are independent from one another.

15. The system of claim 12, wherein each of the first, second, and third air data systems further comprise:
    a first pressure module pneumatically coupled to the first static pressure probe and configured to output a first static pressure signal representative of the static pressure sensed by the first static pressure probe; and
    a second pressure module pneumatically coupled to the second static pressure probe and configure to output a second static pressure signal representative of the static pressure sensed by the second static pressure probe.

16. The system of claim 12, wherein each ADC of the first, second, and third air data systems is co-located with respective pitot pressure sensing probes.

* * * * *